United States Patent [19]

Artz

[11] 4,313,356
[45] Feb. 2, 1982

[54] METHOD OF REMOVING FRONT AND REAR SEGMENTS OF WIRE ROD

[75] Inventor: Gerd Artz, Ratingen, Fed. Rep. of Germany

[73] Assignee: Fried. Krupp Gesellschaft mit beschränkter Haftung, Essen, Fed. Rep. of Germany

[21] Appl. No.: 132,302

[22] Filed: Mar. 20, 1980

[30] Foreign Application Priority Data

Apr. 28, 1979 [DE] Fed. Rep. of Germany ....... 2917305

[51] Int. Cl.³ ............................................. B21F 11/00
[52] U.S. Cl. .......................................... 83/37; 83/167; 83/304; 83/349; 83/444; 83/907; 83/923
[58] Field of Search .................. 83/37, 304, 349, 4 44, 83/907, 175, 167, 923

[56] References Cited

U.S. PATENT DOCUMENTS

| | | | |
|---|---|---|---|
| 3,095,774 | 7/1963 | Hart | 83/907 X |
| 3,222,965 | 12/1965 | Hitchcock | 83/262 X |
| 3,756,289 | 9/1973 | Rotert et al. | 83/907 X |
| 3,776,076 | 12/1977 | Hauck | 83/262 X |
| 3,838,617 | 10/1974 | Felker | 83/907 X |

Primary Examiner—Frank T. Yost
Attorney, Agent, or Firm—Becker & Becker, Inc.

[57] ABSTRACT

A method of removing the front and rear segments of a rolled wire fed in winding packages subdivided into good stock and into scrap windings separated by cutting movements corresponding substantially to the transporting movement of the winding packages. The windings spirally or helically surround a guidepipe element. Several cutting wheels rotate in the region of the upper surface of the guide-pipe element. The cutting wheels, together with counter knives, which stand still during the cutting procedure, form a separating device. The peripheral speed of the cutting wheel and cutters corresponds at least substantially to the transporting speed of the winding packages. A stop element, an intermediately connected adjustable time member or timer, and the counter knives are controlled by at least one sensor unit which operates free of engagement or free of contact therewith and which generates at least one control impulse as a function of at least one predetermined winding number—from which the number of scrap windings to be removed is derived.

6 Claims, 7 Drawing Figures

METHOD OF REMOVING FRONT AND REAR SEGMENTS OF WIRE ROD

The present invention relates to a method of removing the front and rear segments of a rolled wire or wire rod which is fed in the form of winding packages to a collecting device and which is subdivided by separating procedures into good stock and into scrap windings.

With the production of wire in hot rolling mills care must be taken that the front and rear segments of the wire that do not meet tolerance and quality requirements are separated from the further usable good windings and are removed or eliminated from the production process; these front and rear segments are the so-called front and rear crop.

So far as the separating devices are arranged directly after the rolled blocks, the present day extraordinarily high speed of the rolled wire or wire rod makes more difficult the carrying out of the necessary separating procedures. These separating procedures are made possible as is known by a temporary or periodic banking-up or piling-up of the following rolled wire or wire rod during the cutting procedure at the cutting location or also by a diverting of the wire rod or rolled wire in a different direction.

The drawback of this known state of the art consists therein that the wire rod or rolled wire is inclined or has a tendency to escape or break out of the guides connected ahead of the separating device, or to carry out a flutter movement which causes disturbances in the guide region. Additionally, difficulties also result therefrom that the wire often receives a sharp tip or point by way of inclined or slanted cutting-off, and is inclined to twist, tilt or cant in the guide region.

To avoid the aforementioned disadvantages, it has already been suggested to eliminate the nonusable front and rear segments of the rolled wire or wire rod only after the wire rod or rolled wire had been placed in windings, for example in the region of a secondary cooling stretch. The rolling speed equals zero by placement of the rolled wire or wire rod in windings; during the separating procedure there must be consequently considered only the transporting speed with which the winding packages, resulting by rolling of rod material, pass through the secondary cooling stretch.

The disadvantage of this known procedure, as well as of the known apparatus associated therewith, consists in that the windings of the individual winding packages lie one above the other, and consequently cannot readily be freed of the nonusable front and rear segments. The same difficulty exists when the wire rod or rolled wire, by means of a winding placement or layering apparatus, is placed spirally or in a helical form around a conveying device, especially around endless chains.

It is an object of the present invention to provide a method, so that even at the highest roller speeds it is possible to remove the non-usable front and rear segments of wire rod or rolled wire; this means that the unusable front and rear segments of wire rod or rolled wire are to be separated from the good windings and removed with certainty from the further working or treatment process.

This method is especially also to be provided in such a way that the technical complexity connected with carrying out the separating procedure is slight, and the susceptibility to problems is reduced at least to a considerable extent.

These and other objects and advantages of the present invention will appear more clearly from the following specification in connection with the accompanying drawing, in which:

FIG. 3a shows a drive unit with an adjustable time member and stop rod;

The method of the present invention is characterized primarily in that: the windings of the winding packages are placed spirally or in a helical manner around a guide element as well as being transported parallel to the longitudinal dimension thereof, the scrap windings of the front and rear segments are respectively continuously and multiply separating in such a way that the front and rear segments drop from the guide element, and the good windings, as well as the scrap windings of the rear segment, for the purpose of separation from the preceding windings, are respectively periodically or temporarily hindered or precluded from participating in the transporting movement toward the collecting device.

The method of the present invention can be further embodied to have features whereby the good windings are hindered at least so long from participating in the further movement until the last scrap winding of the front segment is dispersed or separated. Furthermore, the scrap windings of the rear segment may be precluded or hindered from participating in the further movement so long until between the preceding good winding and the first subsequent scrap winding a gap has resulted or occurred permitting the introduction or initiation of the dividing or dispersing procedure. The scrap windings may be split up or separated by cutting movements which correspond at least substantially to the transporting movement of the winding packages. The windings of each winding package may be briefly taken along by rotating cutters which periodically simultaneously carry out a cutting movement. The scrap windings of the rear segment and those of the front segment of the following or succeeding winding package may be split up or separated simultaneously with the cutting procedure.

The apparatus for carrying out the method in essence includes: a guide element which movably supports in the longitudinal direction the windings of the winding packages which surround the guide element in a spiral or helical manner; several cutting wheels, which rotate in the region of the upper surface of the guide element, each cutting wheel, together with a counter blade or knife which stands still during the cutting procedure, forms a separating device; and a stop element which is shiftable between the scrap windings and the good windings. Essential components of the novel apparatus accordingly include the guide element, which carries the windings of the winding packages, several rotating cutting wheels which cooperate with the guide element and which have a suitably embodied counter knife or cutter arranged therewith, and a stop element, which is movable or displaceable between the windings to be separated from each other, which means sequentially between the scrap windings of the front segment and the good windings, or between the good windings and the scrap windings of the rear segment.

So far as the cutting wheels are journalled or fixed stationary with respect to the guide element, they rotate continuously so long as the apparatus operates.

The stop element preferably comprises a stop rod or bar which is movable toward the guide element by means of a cylinder mechanism. It has additionally been proven to be advantageous not to rigidly connect the stop element, but rather to connect it to the cylinder mechanism subject to intermediate connection or joinder of a spring element.

Preferred embodiments of the novel apparatus may also include one or more of the following features. The peripheral speed of the cutting wheel-cutters corresponds at least substantially to the transporting speed of the winding packages. The counter knife, in the cutting position, partially engages or enters the guide element. At least the cutting wheels of the separating devices are driven by a common drive unit. The cutting wheels are likewise capable of being pivoted away from the region of the windings. At least the cutting wheels of the separating devices are connected with the pertaining drive unit subject to intermediate connection of linkage or pivot shafts. The guide element is surrounded by three separating devices. The guide element comprises a guide pipe or tube, the upper half of which, on both sides, is equipped with an endless chain extending in the longitudinal direction and supported on knees or consoles. The stop element and, subject to intermediate connection of an adjustable time member, also the counter knives are controlled by at least one contact-free operating sensing unit which generates at least one control impulse as a function of at least one predetermined winding number, from which the number of scrap windings to be removed or eliminated is derived. The counter knife is arranged coaxial with and adjacent the pertaining cutting wheel. The counter knife comprises a pivot arm equipped with a cutter or cutting edge which is movable in the region of the windings. The pivot arm is movable or displaceable counter to the transporting direction of movement of the windings in the region thereof. The pivot arm has a guide foot on that side thereof facing the guide element; this guide foot is directed counter to the transporting direction of movement of the windings. The cutting edge or cutter defines an obtuse angle with the guide foot. The counter knife comprises a counter cutting wheel which, aside from the cutting procedure, rotates in the same rotating direction and with the same speed as the pertaining cutting wheel.

The counter knife, which makes possible the cutting procedure, can be made just like the cutting wheels; in this connection, the counter knife rotates continuously just like the cutting wheel, and is brought to a standstill only when the cutting procedure is to be carried out. This can occur advantageously thereby that the counter knife is uncoupled from the drive of the pertaining cutting wheel and is braked immediately if possible in an accurately prescribed position into the standstill or rest condition.

With an especially simple embodiment of the novel apparatus, the counter knife is embodied as a pivot arm equipped with a cutter movable in the region of the windings. In case a cutting procedure is to be carried out, the pivot arm is swung or pivoted out, preferably by means of a cylinder mechanism, counter to the transporting movement of the windings in the region thereof, and the pivot arm is maintained or held in an accurately predetermined position. The teeth of the rotating cutting wheel sequentially guide the windings to be cut against the cutter or cutting edge of the counter knife and consequently split up or separate the windings.

Figure 1:
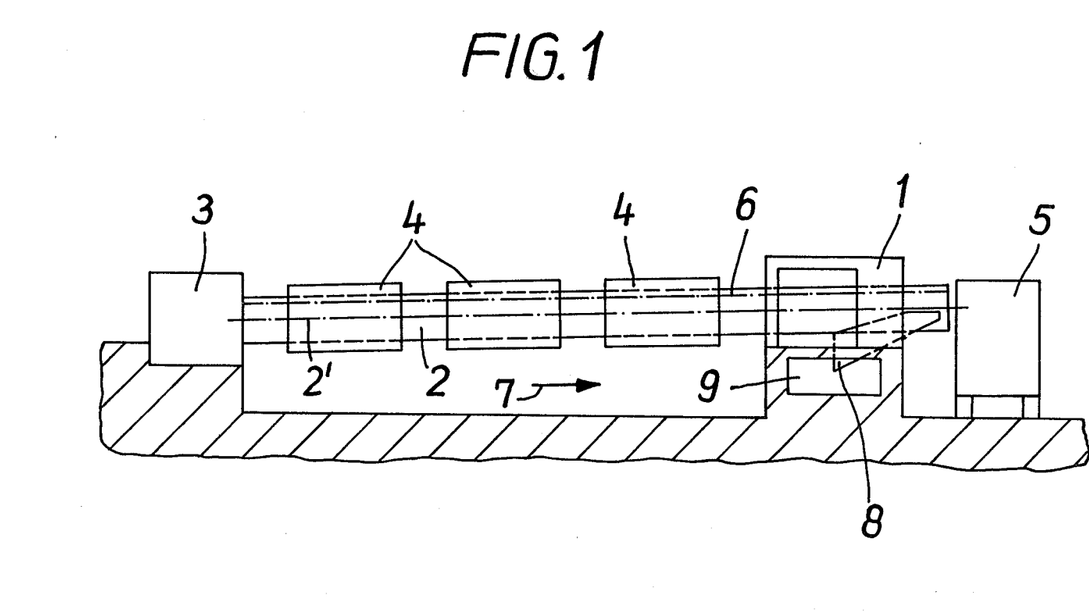
FIG. 1 is a schematic illustration of the principal construction of a secondary cooling stretch or path, equipped with a novel elimination or removal device in accordance with the present invention.

Referring now to the drawings in detail, the novel elimination or removal device 1 shown in FIG. 1 is arranged in the region of the guide element 2, embodied as a guide pipe or tube, which feeds winding or coil packages 4 coming from the winding placement means 3 to a collecting device 5 for the purpose of eliminating or removing unusable front and rear segments. The winding packages 4, which follow each other and resulted from hot rolling of rod material, are supported upon endless chains 6 arranged on both sides of the guide-pipe element 2; the direction of movement of the winding packages 4 in a direction toward the collecting device 5 is indicated by the arrow 7. The removal device 1 is equipped with a scrap removal plate or baffle 8 in the region before the collecting device 5. The divided or dispersed scrap windings are supplied by the plate 8 to a scrap container 9 located below the removal device 1.

The winding placement means 3 and the collecting device 5 can be embodied in a conventional manner; important in this connection is only that the windings of the winding packages 4 surround the guide-pipe element 2 in a spiral or helical manner, and that the latter be guided or passed through the removal device 1. The longitudinal axis 2' of the guide-pipe element 2 rises slightly in the direction of the arrow 7.

Figure 2:
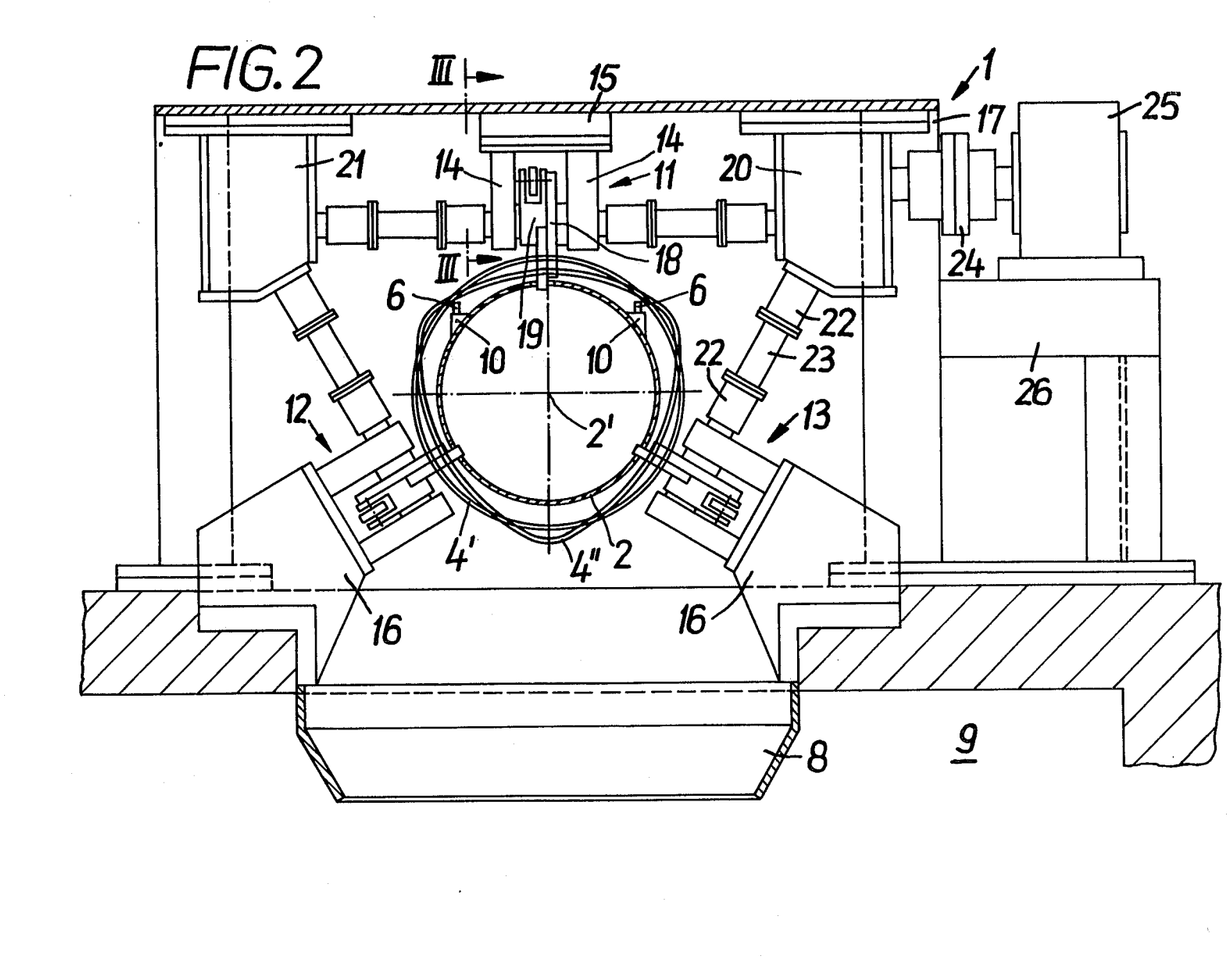
FIG. 2 is a section, taken transverse to the longitudinal extension of the guide element illustrated in FIG. 1, through a preferred embodiment of the removal device.

From FIG. 2, for example, it is apparent how the individual windings of a winding package 4 are supported on both sides upon the already mentioned endless chains 6; the endless chains, which for reasons of facilitating recognition of the features of the present invention have been illustrated purely schematically and without any guide cage, are in turn connected with consoles or knees (Konsolen) 10 in the region of the upper half of the guide-pipe element 2. The preferred embodiment illustrated in FIG. 2 has as essential components three separating devices 11, 12 and 13, which are respectively connected, by way of two stands 14 and a base plate 15 or consoles or knees 16, with a carrier or support frame 17 comprising in essence double "T" carriers or supports.

The separating devices 11, 12 and 13, which have a rotating cutting wheel 18 and a pivot arm 19 arranged coaxially therewith as respective cutting components, are arranged displaced as to each other by 120° with respect to the guide-pipe element 2, whereby the separating device 11 lies in the vertical plane of the guide-pipe element 2.

The removal device 1 has as further essential components two fixed or stationary angle drives 20, 21, by which the cutting wheels 18 are driven by way of couplings 22 with intermediate pieces 23. The angle or indexing drive 20 is connected with a transfer case or twin-range case 5 subject to intermediate connection of a coupling 24, with the transfer case being driven by a non-illustrated drive motor. The transfer case or transmission 25 is seated or installed upon a table 26 which is connected with the carrier or support frame 17.

The already mentioned scrap removal plate or baffle 8 is arranged in the region of the separating devices 11, 12 and 13 below the guide-pipe element 2, and the scrap removal plate 8 projects into the scrap container 9 below the removal device 1.

Figure 3:
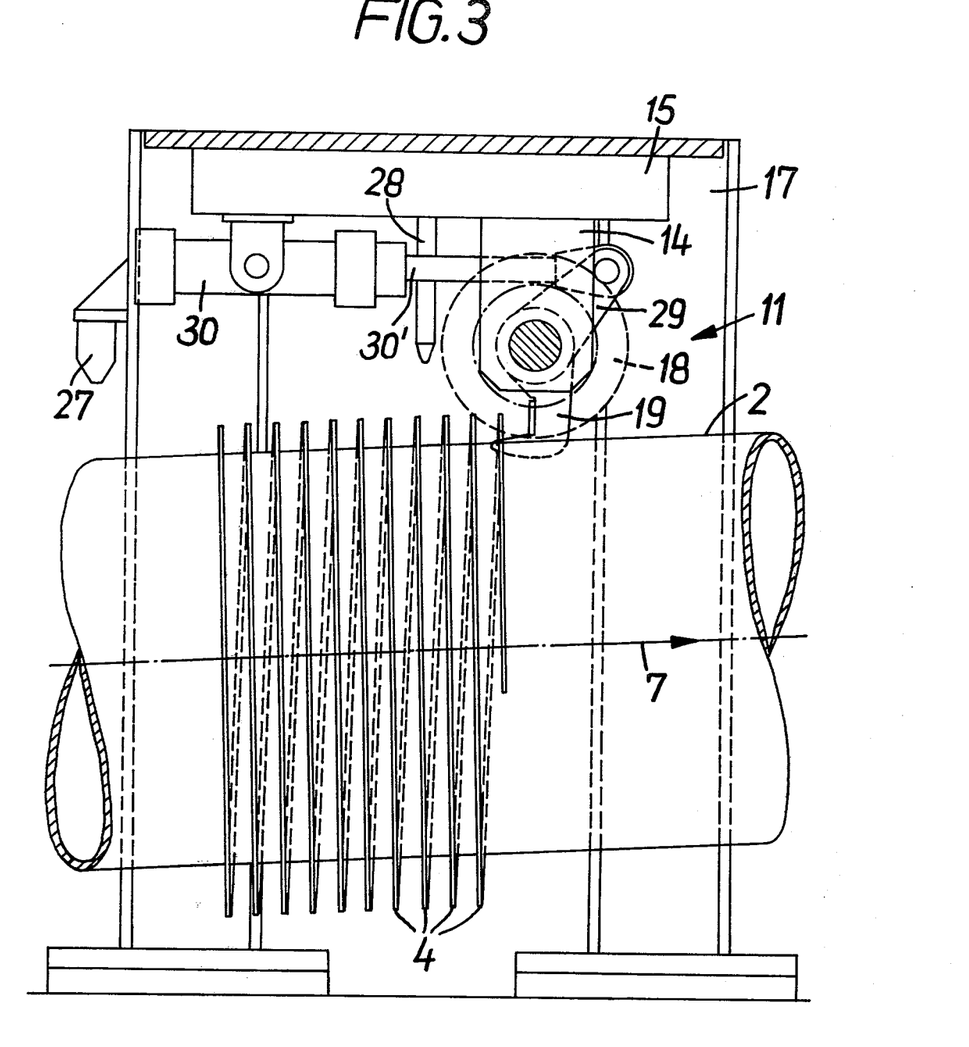
FIG. 3 is an enlarged cross section taken along line III—III in FIG. 2.

As shown in FIG. 3, a photocell 27 and a stop rod or bar 28 are connected in series ahead of the separating device 11 as viewed in the direction of the transporting movement for the winding packages 4 as represented by arrow 7. The photocell 27 serves to detect or sense in a contact-free manner the windings of every winding package 4 which pass by it and after passage of a prescribed number of windings, i.e. on the one hand involving the scrap or low quality windings of the front segment and on the other hand the good windings of the pertaining winding package, the photocell serves to generate a control signal which triggers or releases the actuation of the stop rod or bar 28. The stop rod or bar 28 accordingly travels in a direction toward the guide-pipe element 2, preferably with an adjustable time delay 27' of FIG. 3a, if the scrap windings of the front segment are to be separated from the succeeding good windings, or if the latter are to be separated from the subsequent scrap windings of the rear segment. The drive unit 28' of FIG. 3a for the stop rod or bar 28 preferably comprises a hydraulic cylinder mechanism 30 which is connected with the photocell 27 subject to intermediate connection of a regulator or control device equipped with a counting mechanism. The pivot arm 19 which serves as a counter knife or cutter, is pivotally connected by way of a lever arm 29 to the piston rod 30' of the hydraulic cylinder mechanism 30, which in turn is rotatably supported on the bottom plate 15.

Figure 4:
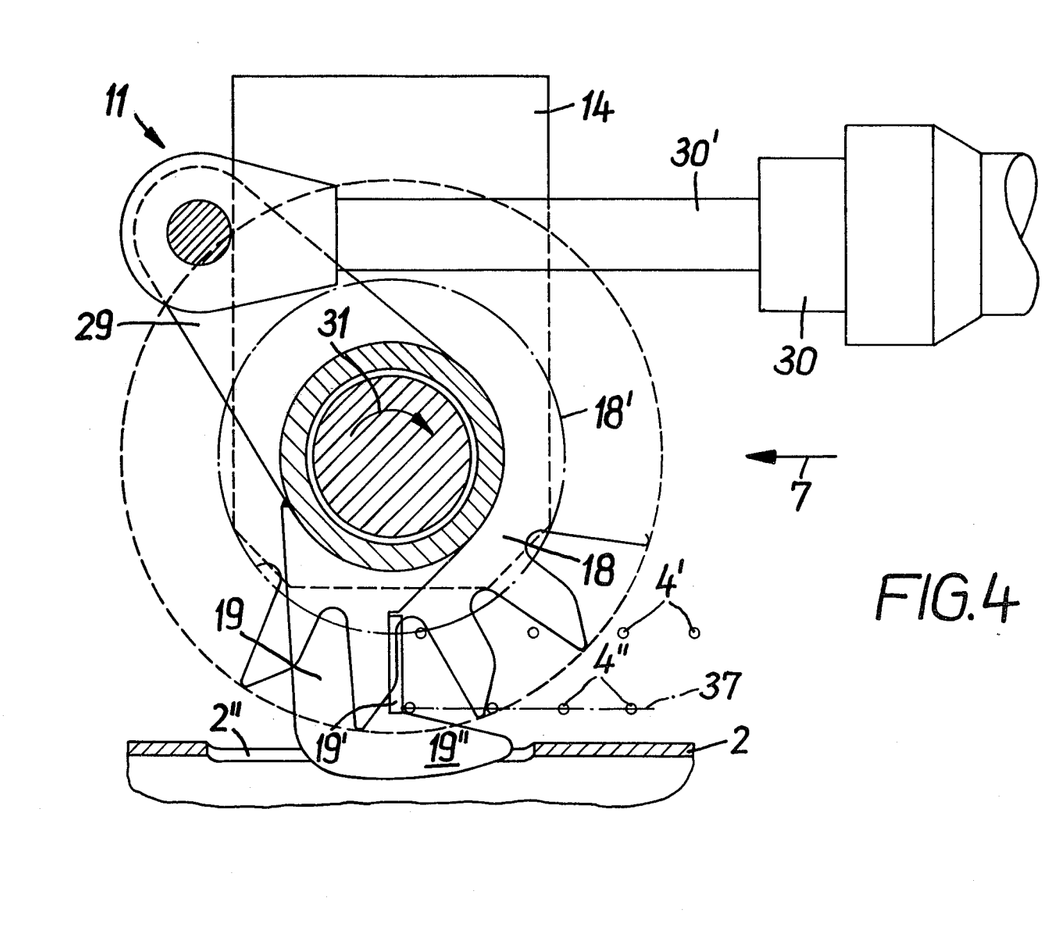
FIG. 4 separately shows details of the separating device in the region of the guide element.
Figure 5:
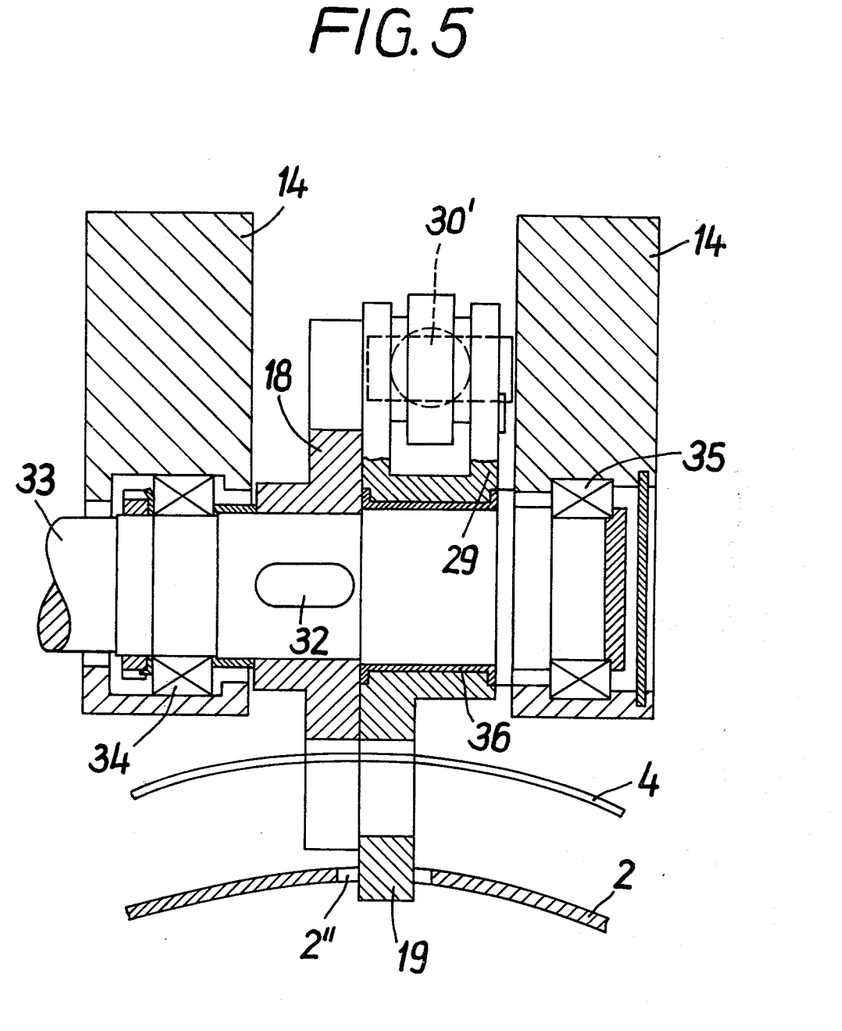
FIG. 5 is a vertical section through the separating device illustrated in FIG. 4.

The design of the separating device 11, which basically corresponds to the design of the separating devices 12 and 13, can be seen in further detail in FIGS. 4 and 5. The cutting edges of the cutting wheel 18, which rotates in the direction of the arrow 31, are in the form of teeth which work together with a cutting edge 19' fastened on the pivot arm 19. This cutting edge 19' defines an obtuse angle with the guide-foot 19" of the pivot arm 19, with the guide foot 19" being directed counter to the direction of transport (arrow 7).

The rotating speed of the cutting wheel 18 is preferably selected in such a way that the peripheral speed in the region of its arc 18' corresponds to the transporting speed of the winding packages 4.

The pivot arm 19 partially engages in the guide-pipe element 2 in the illustrated section over the guide foot 19"; the wall of the guide-pipe 2 is provided with a suitably dimensioned recess 2". After termination of the cutting procedure, the pivot arm 19 is pivoted upwardly by an angle of about 90° in the clockwise direction out of the region of the guide-pipe 2. In the cutting position, the cutter or cutting edge 19' preferably occupies a position in which it extends at, or at least substantially at, right angles to the longitudinal axis 2' (FIG. 1) of the guide-pipe element 2.

In the illustrated embodiment, the cutting wheel 18 has fourteen teeth with an outer diameter of 410 mm and a partial diameter of 267 mm.

The cutting wheel 18 is connected with a driven shaft 33 by way of an adjusting spring 32, and the shaft 33 in turn is supported in the stands 14 by roller bearings 34 and 35. Directly adjacent to the cutting wheel 18, which is kept immovable, the lever arm 29 of the pivot arm 19 is movably supported upon the shaft 33 by way of a journal-bearing bushing 36.

The teeth of the cutting wheel 18 sequentially guide the individual windings 4' in the region of the cutting edge 19', which stands still during the cutting procedure, and thereby severs them. The guide foot 19" additionally is so embodied and so arranged with respect to the guide-pipe element 2, that also deformed wires 4" lying upon the line 37 are taken along by the teeth (also see FIG. 2) and are severed in the region of the cutting edge 19'.

The removal device 1 described in detail in the foregoing specification operates as follows:

As soon as the photocell 27 (see FIG. 3) detects a prescribed number of scrap windings, the stop rod or bar 28 is extended or moved out, with a time delay, for the grasping procedure, and as a result, the last scrap winding of the front segment is separated or cut from the first good winding. The pivot arm 19, which serves as the counter blade or knife, still occupies the cutting position indicated in FIGS. 3, 4 and 5, in which the guide foot 19" projects into the guide-pipe element 2, after scrap windings of the rear segment of the preceding winding package 4 have been divided or separated and removed into the scrap container 9 by way of the scrap removal plate 8.

As soon as the last scrap winding of the front segment has been separated, the pivot arm 19 is swung or pivoted upwardly in the direction of the arrow 7, and the stop rod or bar 28 is moved upwardly, so that the thereby released good windings can be fed to the collecting device 5 by means of the endless chains 6 (see FIG. 1). All cutting wheels 18, in the region of the arc or partial circular segment 18' thereof (FIG. 4), have the same peripheral speed as the endless chain 6 and, during the entire running time of the wire rod or rolled wire, all cutting wheels 18 are in engagement or mesh to move along therewith.

As soon as the photocell 27 (or another photocell) has detected the passage of the last good winding, the stop rod or bar 28 is again brought forth or moved out, displaced in time, for the grasping procedure. The herewith associated banking-up or piling-up of the succeeding or subsequent scrap windings of the rear segment of the winding package 4 has as a consequence the formation of a gap or interval between the windings to be separated from each other, so that the pivot arm 19 can again be moved into the illustrated cutting position. As soon as this has occurred, the stop rod or bar 28 is moved up or retracted, whereupon the scrap windings of the rear segment are engaged by the teeth of the cutting wheels 18, are pressed against the pertaining cutting edges 19', and are cut in this location.

Since the removal device 1 has three separating devices 11, 12 and 13 arranged displaced with respect to one another, the windings are respectively divided into three parts and, moreover, also in the highest-located winding point as determined by the arrangement of the separating device 11. This manner of dividing or dispersing assures that the resulting scrap pieces drop with certainty from the guide-pipe element 2 into the region of the scrap removal plate 8 located therebelow.

Figure 7:
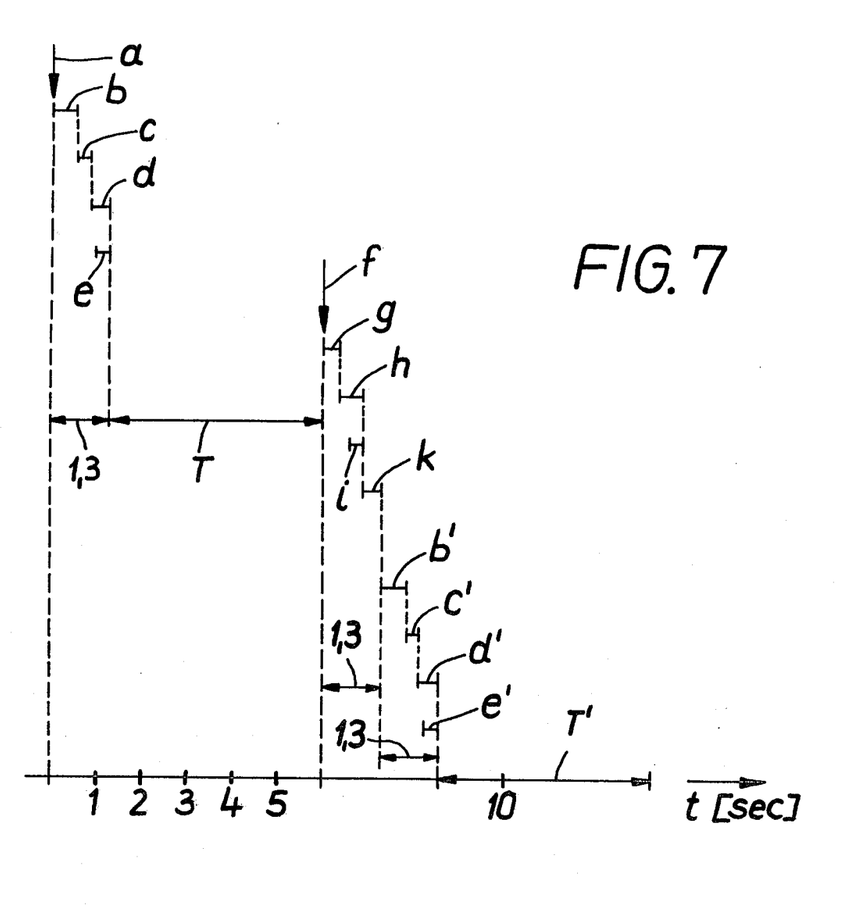
FIG. 7 is a schematic diagram from which the durations and time sequences of the method steps are illustrated for the method or procedure carried out in a preferred manner.

The sequence of the just indicated method steps is illustrated schematically for clarification; in FIG. 7 over a time period "t" the individual method steps are designated with lower case letters in FIG. 7.

The photocell 27 (see FIG. 3), after detecting a prescribed or predetermined number of scrap windings, triggers or releases a control impulse "a" by way of a subsequently connected non-illustrated counting device; the impulse, after swinging or pivoting out of the counter knife or cutter, has as a consequence the dividing or separating "b" of the succeeding or sequentially following scrap windings. The stop rod or bar 28 is moved out in a direction toward the guide-pipe element 2 (method step "c"), preferably displaced in time with respect to the dividing procedure, before the counter knife retracts or pivots back into the rest position and accordingly the cutting procedure is terminated (method step "d"). Displaced in time with respect to the retracting or pivoting back of the counter knife, the stop rod or bar 28 is retracted or moved upwardly into the rest position in such a manner that this method step "e" is concluded or terminated simultaneously with the termination of method step "d".

The time interval which is necessary for carrying out the method steps "a" through "e" amounts to approximately 1.3 seconds.

The wire windings released by the upward travel or retracting step "e" of the stop rod or bar 28 are moved or advanced in the transporting direction within a time interval "T" of approximately 4.7 seconds.

As soon as the photocell 27 has detected the passage of the winding package, a second control impulse "f" is triggered or released by means of the already mentioned counting device, and this control impulse "f" has as a consequence the projection or traveling-out step "g" of the stop rod or bar 28 toward the guide-pipe element 2, and subsequently thereto brings about the step "h" or pivoting-in movement of the counter knife into the operating position, and displaced in time with respect thereto, the retraction or upward movement step "i" of the stop rod or bar 28 and after termination of the method step "h" and "i", the separating or dividing step "K" of the temporarily banked or piled-up scrap windings of the rear segment of the winding package involved therewith.

The dividing or separating step or procedure b' of the scrap windings of the front segment of the succeeding or immediately following winding package follows directly after the dividing step or procedure "k", before the succeeding or following good windings are banked or piled up by the renewed or repeated moving-out step c' of the stop rod or bar 28, and before the dividing or separating procedure or step is terminated by retraction or pivoting back step d' of the counter knife into the rest position. After initiating the retraction or pivoting-back procedure or step, the stop rod or bar 28 is again retracted or moved upwardly into the rest position (method step e') in such a manner that both mentioned steps are concluded approximately simultaneously.

The succeeding or following windings, released or set free after the retraction or moving up of the stop rod or bar 28, move as previously mentioned during a time interval or span T', and advance in a direction toward the subsequently connected collecting device (FIG. 1).

The resetting of the counting device, which is connected after the photocell 27, is preferably effected by means of a second sensor device; this sensor device generates a resetting impulse as soon as, for instance, the first or last good winding of a winding package, after departing from the removal device, has reached a predetermined section on the guide-pipe element 2 or a predetermined position with respect to a subsequently connected device.

To adapt to changing operating conditions or requirements, at least one delay unit is connected after the counting device, and by means thereof the control impulse for the handling or treatment of the scrap windings of the front or rear segments of a winding package can be adjusted in time (control impulses "a" and "f" in FIG. 7). The preselectable time delay is expediently so accurately adjustable in this connection that a transporting path of the windings upon the guide-pipe element corresponds thereto by just a few centimeters.

Figure 6:
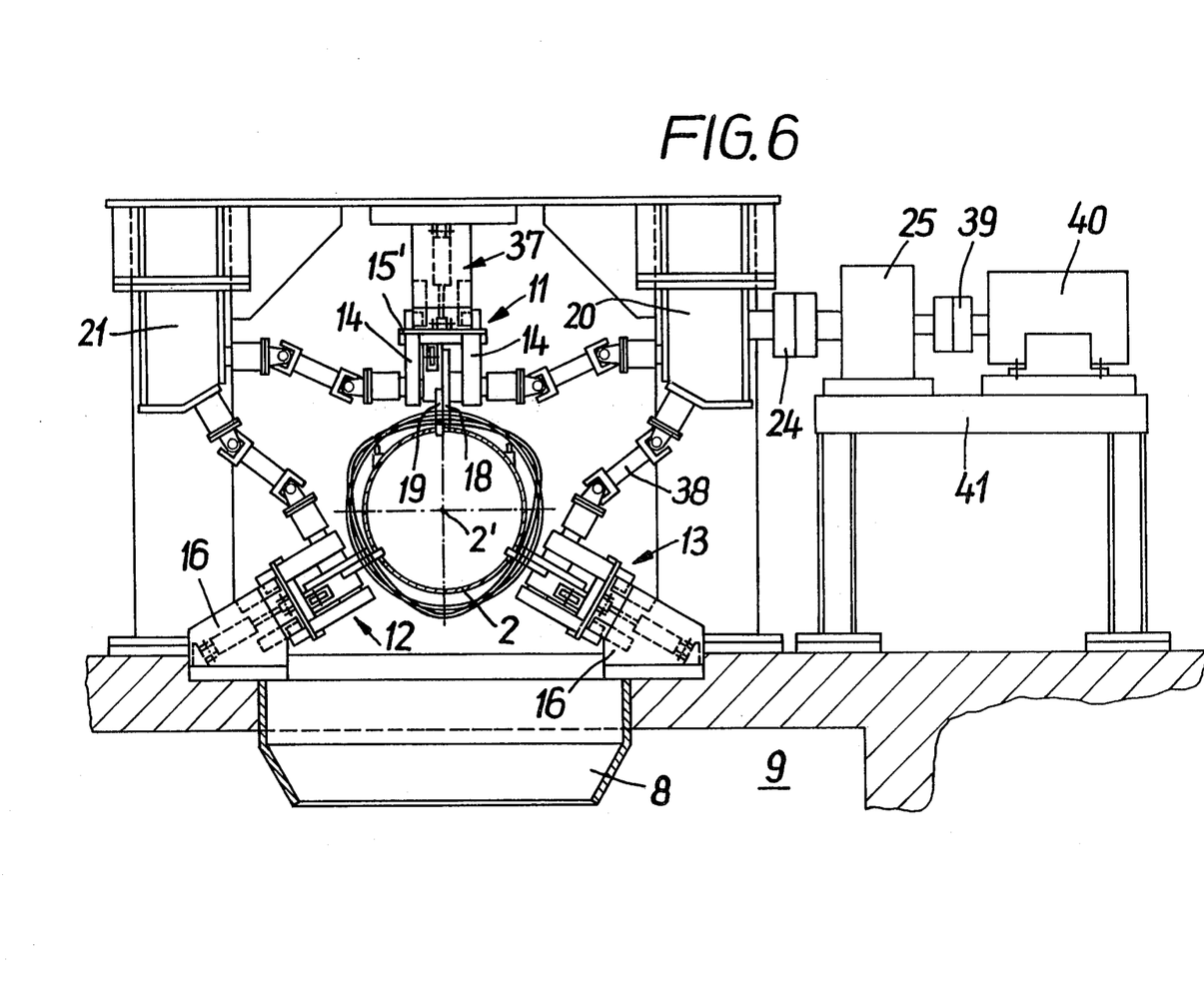
FIG. 6 is a section taken transverse to the longitudinal span or extension of the guide element through a removal device which has three separating devices arranged adjustably with respect to the guide element.

The preferred embodiment illustrated in FIG. 6 differs in essence from the just described embodiment in that the separating devices 11, 12 and 13 are pivotally arranged with respect to the guide-pipe element 2. This separating device, aside from the already mentioned stands 14, has a pivotally held base plate 15' to which the piston rod of the hydraulic cylinder mechanism 37 is pivotally connected. The cutting wheels of the separating devices 11, 12 and 13 are not connected with the pertaining angle drives 20, 21 by way of rigid couplings (see for example FIG. 2), but rather by way of linkage or pivot shafts 38.

The twin-range case, pre-connected transmission drive, or transfer case 25 is connected with the drive motor 40 along with the intermediate connection of a coupling 39; the drive motor 40 is preferably variable in speed. The parts or components 25, 39 and 40 are arranged upon a special or separate table 41.

The operation of this second embodiment corresponds to that of the first embodiment, with the exception that with the pivoting-out or outward shifting of the pivot arm, which serves as a counter knife, simultaneously the complete separating devices 11, 12 and 13 are pivoted so far away out of the region of the guide-pipe element 2 that the parts or components 18 and 19 no longer engage the rolled wire or wire rod which is passing through. This has the advantage that, especially with handling or treatment of the wire rod or rolled wire made of sensitive materials, upper surface damaging by way of the otherwise following cutting wheels 18 which run along therewith no longer occurs.

The advantage of the novel removal device 1 consists especially therein that the windings need to be stopped or held by the stop element only so long until the counter knives are pivoted into the cutting position or into the rest position; also with great production capacity of the interposed hot rolling path there cannot arise any disadvantageous banking or piling-up, and consequently also no damage can occur to the windings lying upon the endless chains.

A further advantage of the present inventive teaching consists therein that the severing and dispersing of the scrap windings can be carried out in one operating step with a continuously running material flow. This is also advantageous insofar as only a small number of separating devices need be installed, and consequently the susceptibility of the removal device to problems is small.

The present invention is, of course, in no way restricted to the specific disclosure of the specification and drawings, but also encompasses any modifications within the scope of the appended claims.

What I claim is:

1. A method of removing front and rear segments of a rolled wire which is fed in the form of winding packages to a collecting device and is subdivided by separating procedures into good and scrap windings, said method including the steps of:
   spirally placing the windings of successive winding packages around a guide element;
   transporting said windings parallel to the longitudinal extension of said guide element;
   continuously and repeatedly separating the scrap windings of the front and rear segments of respective winding packages in such a way that said separated scrap windings drop from said guide element; and
   temporarily hindering participation of a respective good winding and a respective scrap windings of a rear segment in their transport movement toward said collecting device for the purpose of separating a respective scrap winding from the windings.

2. A method according to claim 1, which includes the step of hindering the participation of a respective good winding at least until the last scrap winding of the front segment is separated.

3. A method according to claim 2, in which the scrap windings of a respective rear segment are hindered from participation so long until between the preceding good winding and the first subsequent scrap winding a gap has resulted permitting initiation of the dividing procedure.

4. A method according to claim 3, which includes the step of separating scrap windings by cutting movements which correspond at least substantially to the transport movement of said winding packages.

5. A method according to claim 4, which includes the step of briefly taking along the windings of each winding package by rotating cutters which periodically simultaneously carry out a cutting movement.

6. A method according to claim 5, which includes the step of separating the scrap windings of the rear segment and those of the front segment of the succeeding winding package sequentially with the cutting procedure movement being maintained.

* * * * *